(12) United States Patent
Bandstra

(10) Patent No.: US 7,785,059 B2
(45) Date of Patent: Aug. 31, 2010

(54) FORWARD DISCHARGE BLOWER UNIT

(75) Inventor: John R. Bandstra, Eugene, OR (US)

(73) Assignee: Astec Industries, Inc., Chattanooga, TN (US)

( * ) Notice: Subject to any disclaimer, the term of this patent is extended or adjusted under 35 U.S.C. 154(b) by 514 days.

(21) Appl. No.: 11/468,256

(22) Filed: Aug. 29, 2006

(65) Prior Publication Data

US 2007/0201978 A1    Aug. 30, 2007

Related U.S. Application Data

(60) Provisional application No. 60/712,982, filed on Aug. 30, 2005.

(51) Int. Cl.
*B60P 1/38*     (2006.01)
(52) U.S. Cl. .................... 414/502; 414/526; 414/528
(58) Field of Classification Search .............. 406/32; 414/526, 502, 528
See application file for complete search history.

(56) References Cited

U.S. PATENT DOCUMENTS

| | | | |
|---|---|---|---|
| 3,024,932 A * | 3/1962 | Dodgen | 414/489 |
| 3,202,320 A | 8/1965 | Patton | |
| 3,730,395 A | 5/1973 | Gallogly et al. | |
| 4,140,349 A | 2/1979 | Behnken | |
| 4,379,664 A | 4/1983 | Klein et al. | |
| 4,410,106 A | 10/1983 | Kierbow et al. | |
| 4,473,016 A | 9/1984 | Gust | |
| 5,556,237 A * | 9/1996 | Rexius | 406/32 |
| 5,590,984 A * | 1/1997 | Assarsson | 406/32 |
| 5,592,889 A | 1/1997 | Bourgault | |
| 5,906,471 A * | 5/1999 | Schwoerer | 414/505 |
| 6,036,406 A | 3/2000 | Rexius | |
| 6,131,830 A | 10/2000 | Jones | |
| 6,290,150 B1 | 9/2001 | Jones | |
| 6,357,971 B1 | 3/2002 | Rexius | |
| 6,776,569 B1 * | 8/2004 | McMahon et al. | 414/505 |

\* cited by examiner

*Primary Examiner*—Saúl J Rodríguez
*Assistant Examiner*—Jonathan D Snelting
(74) *Attorney, Agent, or Firm*—Schwabe, Williamson & Wyatt

(57) ABSTRACT

A blower unit is configured to have a forward containment portion for housing mechanical equipment for receiving and dispensing material particles as ground cover. A rear containment portion is provided for containing such material particles. A material mover preferably operable in forward and rearward direction will feed material to the mechanical equipment for breakdown and pneumatic disbursement. A rear door design enables convenient unloading of the material with the live floor directionally reversed. Benefits include a more convenient means for servicing of the blower mechanism including e.g. an engine providing a motor source, dispensing hose, rotary air lock feeder and mixing chamber e.g. T injector or dropout (term as used in the industry).

10 Claims, 5 Drawing Sheets

FORWARD DISCHARGE BLOWER UNIT

RELATED APPLICATION

This application claims priority to U.S. Provisional Application No. 60/712,982, entitled "FORWARD DISCHARGE BLOWER UNIT" filed on Aug. 30, 2005, which is hereby fully incorporated by reference.

FIELD OF INVENTION

The present invention relates generally to the field of blower trucks, and specifically to a blower truck having a discharge of container contents at the forward end of the container.

BACKGROUND

Blower trucks are often used to transport and blow (pneumatically convey) into place bark dust, mulch, compost, wood chips, rubber particles, and other fragmented materials. The blower truck and these materials are commonly used, but not exclusively, for landscaping, erosion control, mud control, new or regenerative lawn installations, and/or animal bedding. Current blower unit configurations include elongate box-like material containers that are mounted to a truck or trailer. They may consist of a large material container that contains a conveying means that moves the material towards the rear of the container to a series of auger/tines (e.g. double screw-pipe auger and rotatably mounted rakes). The auger/tines break down and direct the material towards an underlying airlock feeder at the rear of the container. The airlock feeder then meters the material into a pressurized air stream. Once in the air stream the material is pneumatically conveyed through a flexible conduit, or hose, to be directed by an operator to the desired location. The truck component for motorized transportation of the blower unit is conventionally located at the forward end of the unit.

BRIEF DESCRIPTION

The blower unit as generally described has a number of deficiencies to which the present invention is directed. With the material metering mechanism including air lock feeder, auger/tines, air/material mixing chamber, hose connections and the like, located at the rear end of the blower unit, there is first, a weight distribution issue. The rear end will likely be too heavy to allow maximization of material containment. By locating the mentioned equipment e.g. over the front end axles, the rear end axle's weight can be maximized with the weight of the material to be dispersed.

Whereas loading and unloading of material may be accomplished through an open top of the container, it frequently is desirable to also or instead of top loading, to provide loading through a tail endgate. Placement of the equipment at the front end with material feed directed toward the front end from the rear end, in accordance with embodiments of the present invention, allows for more convenient rear end loading of the material.

Prior units having a tail endgate and rear mounted material metering mechanism typically provide for the auger/tines to be mounted on the tail endgate. This requires complex mechanism and limits mechanical design, and creates mechanical design difficulties that are avoided with the material metering mechanism mounted on the front end.

In occurrences where a job is completed prior to fully emptying of the container, the unloading of the unused material through a tail endgate or rear door is inhibited by the material metering mechanism located at the rear end. In accordance with embodiments of the present invention a blower unit having a front end location and including a reversible live floor, the material can be readily moved rearwardly and dispersed through the tail endgate.

Still further, the container having front end location for the material metering mechanism in accordance with various embodiments may be more readily adapted for the loading and transporting of other items e.g. as may be desirable for use at a work site. Also the servicing of the material metering mechanism may be readily accommodated via an access doorway provided at a front end location of the container. These and other advantages will become apparent to those skilled in the art upon reference to the following detailed description having reference to the accompanying drawings of the invention.

DETAILED DESCRIPTION OF PREFERRED EMBODIMENTS

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
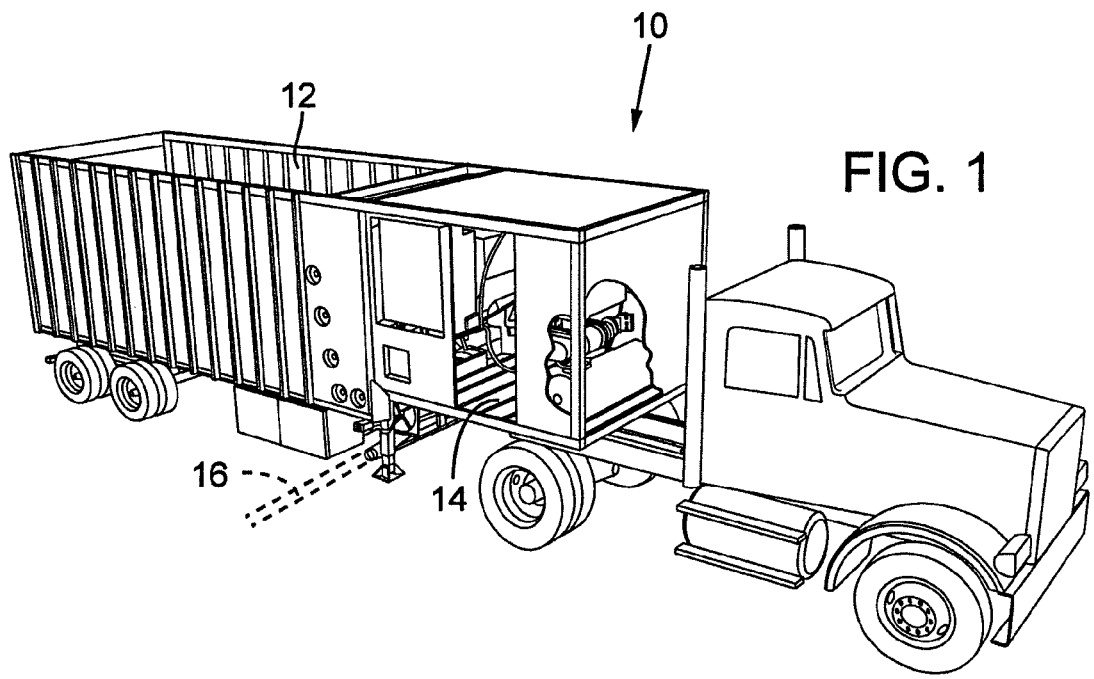
FIG. 1 illustrates a tractor-trailer type blower unit in accordance with the preferred embodiment.

Embodiments of the present invention may include a blower unit having a large container 10 including a rear material containment portion 12, and a mechanical equipment containment portion 14 at the forward end, wherein material contained in the container is adapted to be fed to a transversely disposed feeder at the front end of the container and discharged at a location towards the forward end of the container 10 e.g. via a dispensing hose as illustrated in FIG. 1 by reference 16.

In one embodiment, which is illustrated in the figures contained herein, 15 yard, 40 yard and 70 yard self-contained blower trailer units are illustrated. It can be appreciated that the size of the containment portion 12 may be changeable by lengthening or shortening the overall length of the container 10. A mechanical portion of the blower unit may be positioned forward of the forward end of the containment portion 12, and house the air source, electronics and controls that facilitate discharge of the material contained in the container. The engine for providing power to the mechanism is specifically illustrated as item 13 in FIGS. 3 and 4.

Figure 2:
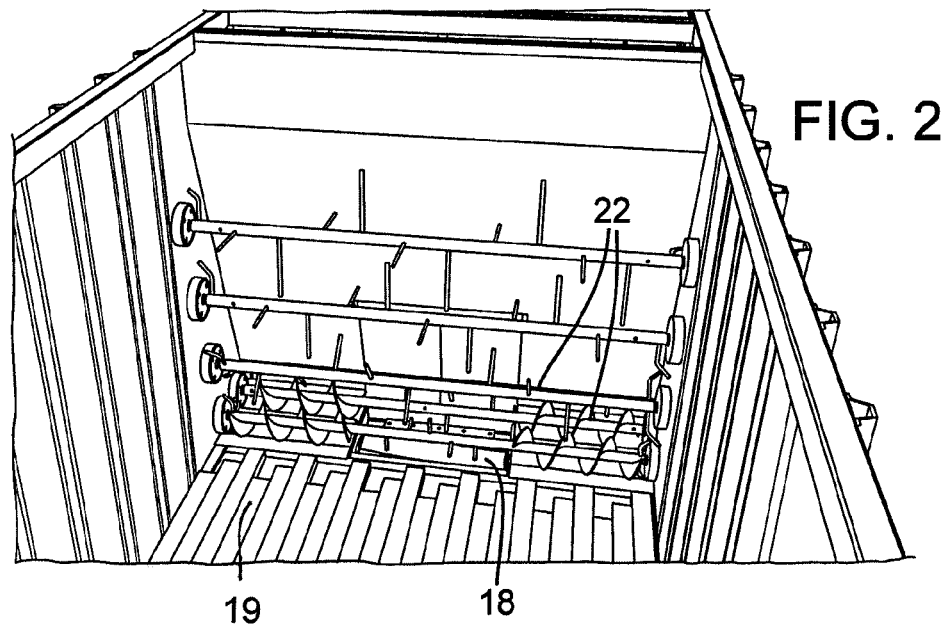
FIG. 2 is a rear end, forward view of the material metering mechanism as illustrated in the embodiment of FIG. 1.
Figure 3:
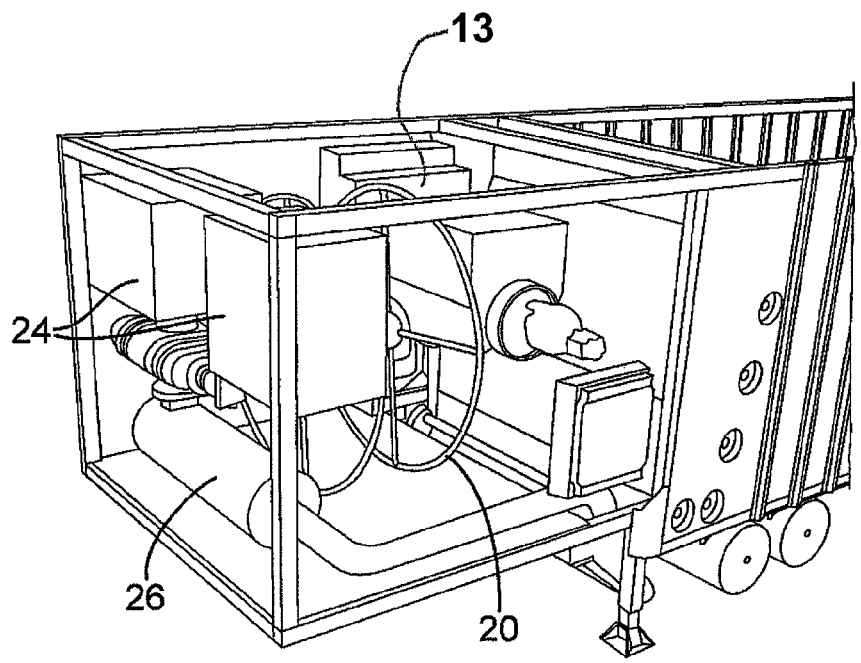
FIGS. 3 and 7 are side, front views of the mechanical portion of FIGS. 1 and 2.

As shown in the FIGS. 2 and 3, the material metering mechanism, including airlock feeder 18 (FIG. 2) and the blower hose reel 20 (FIG. 3) may be positioned near the forward portion of the container. Such placement and configuration may solve many of the deficiencies currently encountered in rear discharge blower units, including, but not limited to:

Better weight distribution

Simpler/lighter box construction

Figure 5:
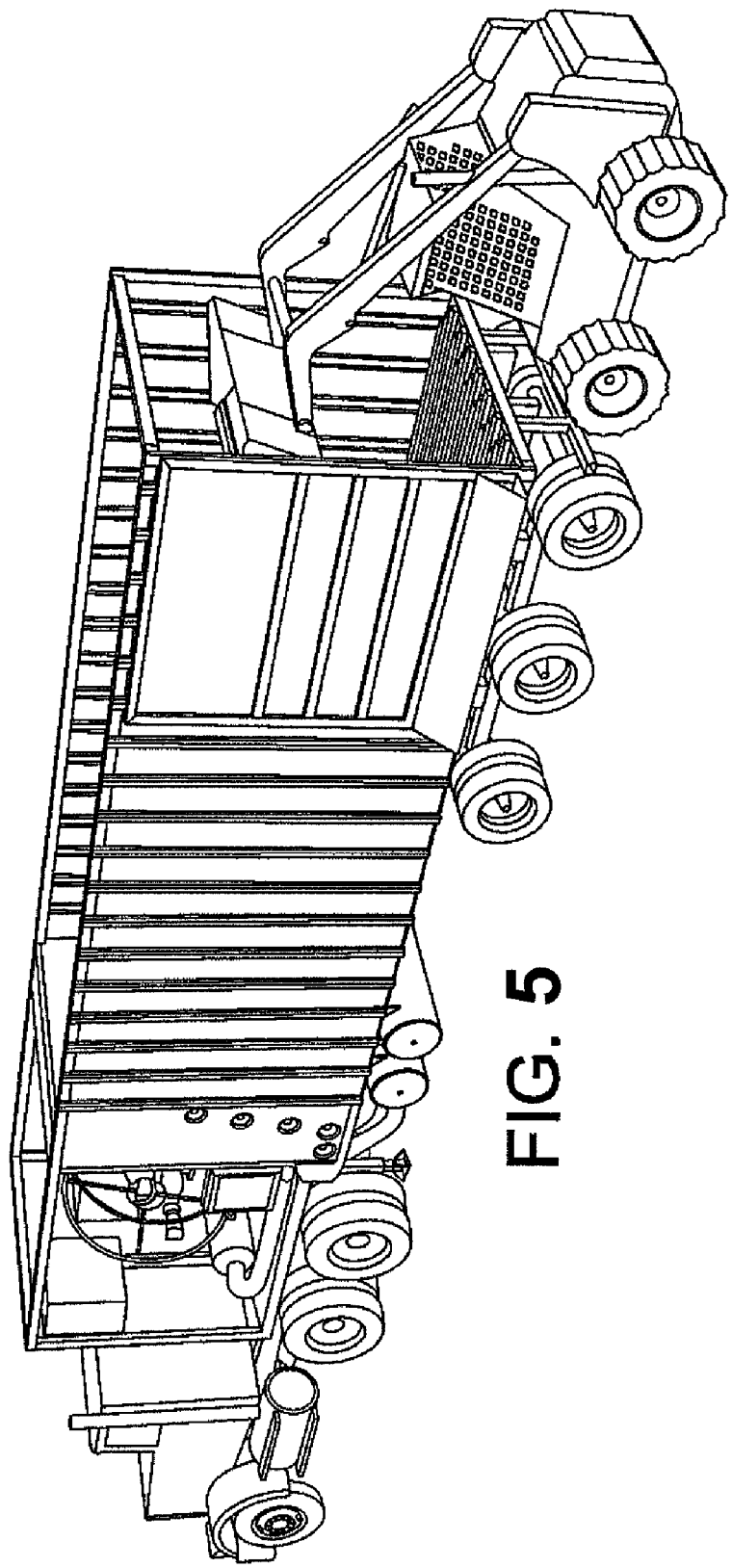
FIGS. 5 and 6 illustrates alternate uses of the container unit of FIGS. 1-4.

Material is loadable from the back of the trailer while blowing (FIG. 5)

Easier off loading of material, because the live floor does not have to push material over the air lock feeder (e.g. rotary vane air lock feeder)

Figure 6:
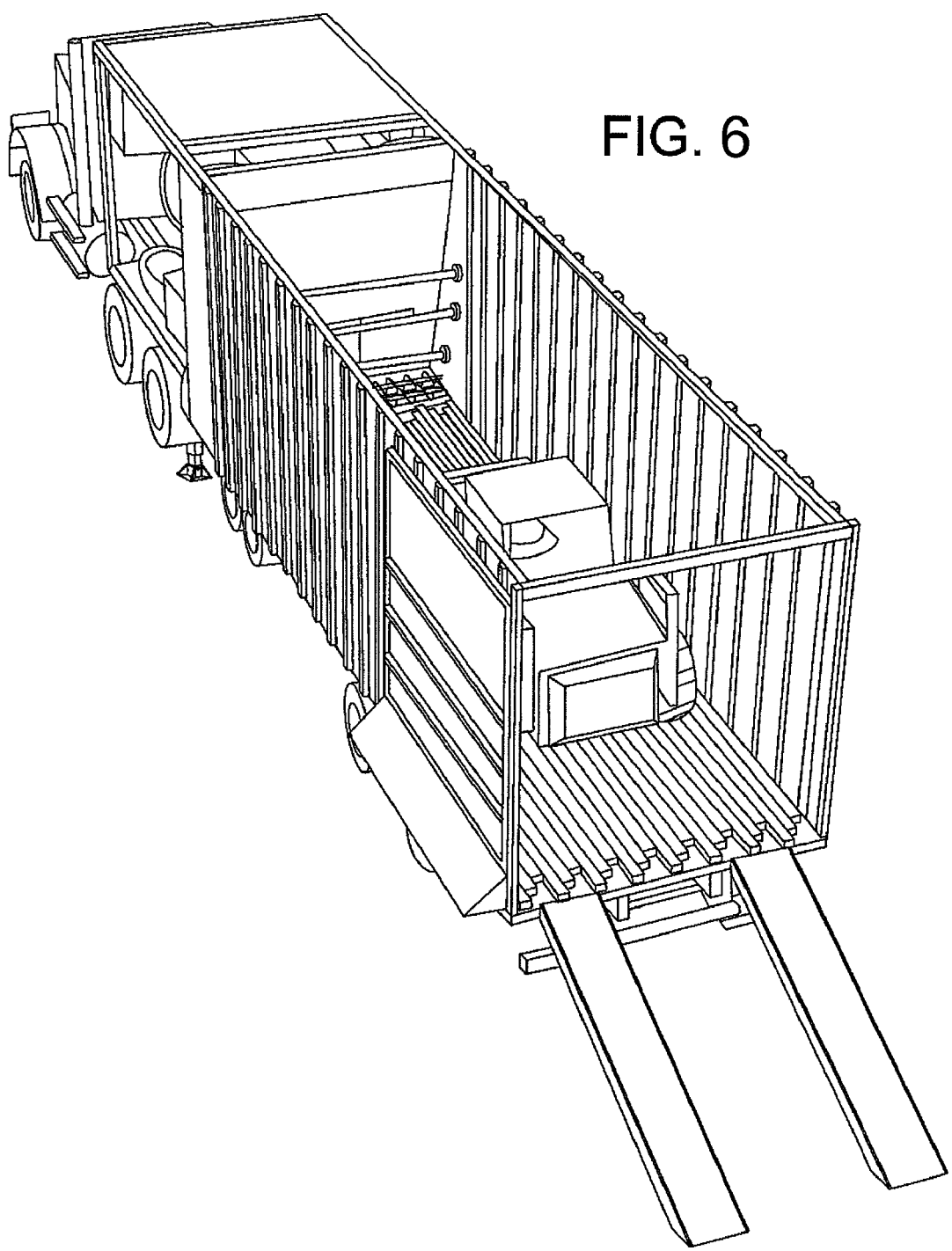

Equipment can easily be loaded into the trailer to transport to the job site (FIG. 6)

Allows for the tines to be angled at the front of the trailer for better material flow to the feeder Very simple/light weight endgate design As shown in FIG. 2 the feeder 18 may be positioned across the front of the material container with, for example, double screw-pipe augers and rotatably mounted rakes (identified generally as auger/tines 22) disposed above the feeder. FIG. 2 is a view looking from the back of the trailer towards the front material discharge end. In various embodiments, a material mover, such as a live floor 19, feeds material into the feeder 18 better when feeder 18 is mounted towards and/or in the center of the container and generally perpendicular to the live floor 19 because the material can naturally drop into the feeder and still be controlled by the auger/tines 22. Such placement also allows for easier access to the feeder.

When blowing poorly fragmented materials, these materials have a tendency to bridge over the feeder 18 and interrupt discharge. In one embodiment, the tines shafts (of auger/tines 22) may be disposed above the feeder at a greater angle with respect to the vertical. This angle may allow for better control and movement of the material to the feeder by helping prevent a material pile face that is too steep, which often is the cause of bridging. Positioning the tine shafts at a greater angle is difficult to do in current blower trucks by virtue of the tines being carried by the tail endgate. Further, it is impractical to incorporate the tines into the rear of the material container, as it may restrict access to the material container (i.e. forward of a rear end mounted blower/feeder mechanism).

One reason transversely disposed feeders have not been positioned at the front of a truck mounted container is due to the fact that when the material container/blower system is mounted onto truck chassis, the feeder would hang below the floor and interfere with the truck frame. Also, traditional blower trucks did not have a live floor (belt style) that could move material in both directions.

In one embodiment, a self contained blower unit may have an independent engine, which may allow for driving of the drive wheels and thereby moving of the blower unit i.e. in a forward direction while the contents of the container are being discharged. In one embodiment, including an independent power source, more power was available to the blower, which will result in increased production when blowing heavier materials. For current PTO based systems, such production increases are not believed to be attainable. Such driving of the drive wheel may also be provided by the illustrated engine 13.

In one embodiment, the self contained blower unit may allow for an increased capacity of the necessary support features, by allowing more space in the mechanical equipment support portion of the unit e.g. see FIG. 3. Such increased capacity may include, but is not limited to: larger hose reel 20; increased volume treatment material tanks 24; increased fuel load (portion 12); inclusion of an intake and discharge silencer 26; single or multiple seeders; hydraulically driven hydraulic oil cooler fan; and a live floor cleanout device that may work in both load and unload mode. Additionally, the forward mechanical support portion may provide for easier access to blower, hydraulics, and other control components. FIG. 3 shows an example of an arrangement of the engine, hose reel, blower, etc. at the front of the trailer.

Figure 4:
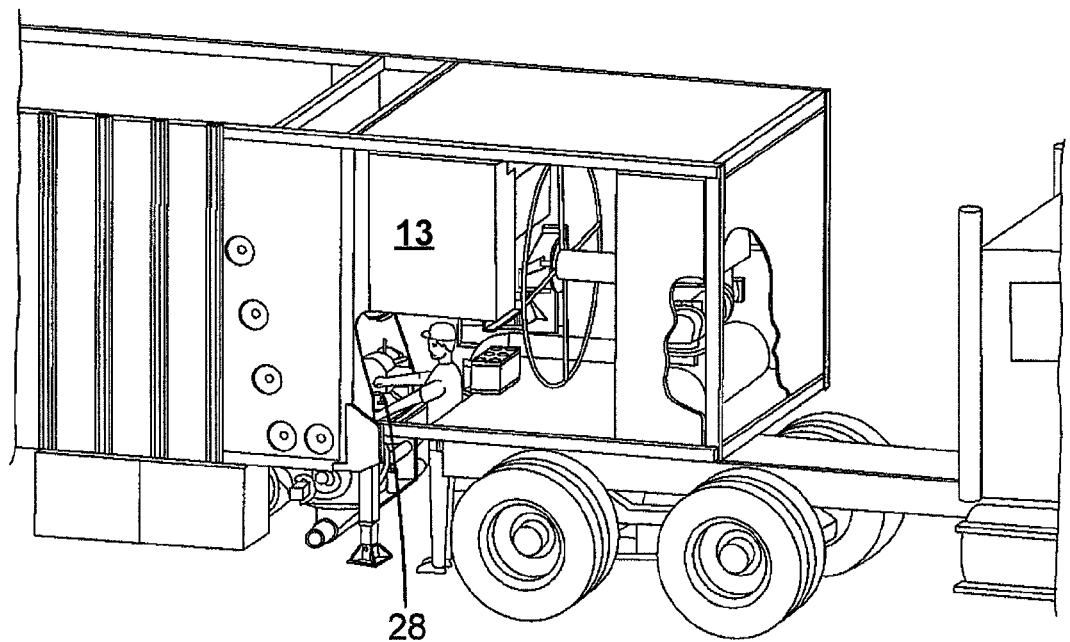
FIG. 4 is a side, front view from the opposite side as seen in FIG. 3.

As shown in FIG. 4, in one embodiment, access to the feeder and auger/tines may be available through doors 26 at the rear portion of the mechanical control portion of the unit. To better allow such access to the feeder area, the engine may be positioned higher in the mechanical control portion. In one embodiment, the blower unit may be configured to shut the machine down when such access doors are opened to avoid injury.

Embodiments of the forward discharge blower unit in accordance with the present invention may also allow for the increased weight carrying capacity of the container. In some configurations a blower trailer unit could carry 50% more weight than a conventional chassis mounted blower units, thus greatly increasing the load carrying capacity of heavy materials. This is beneficial, as the blower truck market is trending towards dispersing heavier material that may be used, for example, for erosion control and lawn installations. Both of these applications may include, for example, the addition of seed, fertilizer, and/or polymers as the container contents are being blown.

As illustrated in FIG. 5, embodiments of forward discharge blower units in accordance with the present invention may also allow material to be loaded into the material container from the rear of the trailer while blowing material via the front mounted material metering mechanism. And, as illustrated in FIG. 6, in another embodiment, support and/other equipment may be easily loaded into the material container for transport to the job site.

Figure 7:
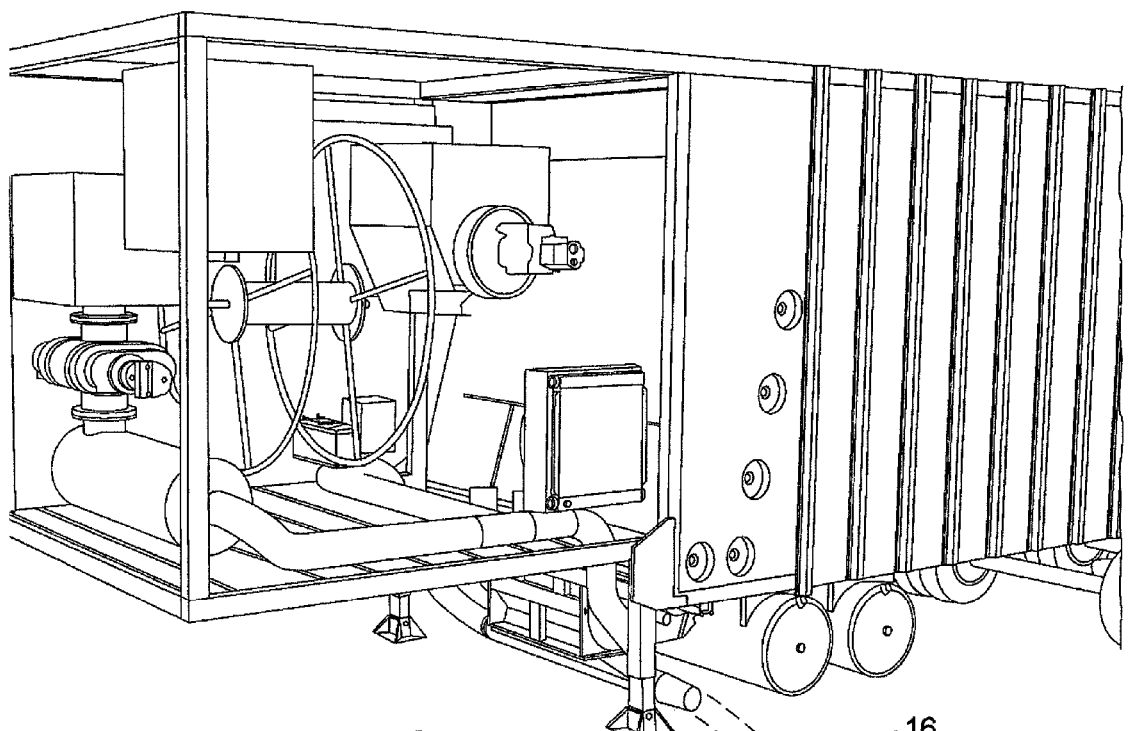

Embodiments of forward discharge blower units in accordance with the present invention may also allow for quick and easy reconfiguration of the blower pipe to allow for discharge on either side of the unit, such as the driver's side of the trailer as shown in FIG. 7. Such adaptability may allow for easier access to jobs on the median of a highway, for example, or when access is difficult in a small area.

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A blower unit for dispensing fragmented material particles as ground cover, said blower unit adapted to be transported from site to site by a power source at a forward end of the blower unit, said blower unit comprising:
a mobile container having substantially vertical side walls, a rear end and a forward end, at least a portion of the container adapted to contain the material particles in bulk;
a material mover disposed at least partially in a floor of the container and extending substantially wall to wall between the substantially vertical side walls in the form of a bi-directional live floor which functions to move the material particles in either forward or rearward direction and further functions as a floor support enabling the alternate hauling of a material handling vehicle,
and a breakdown mechanism at said forward end for breaking down the material particles as received in bulk from the material mover, and
an air blower and a material metering mechanism at said forward end, said material metering mechanism including a transversely disposed feeder adapted to receive said material particles as broken down, a dispensing hose coupled to said material metering mechanism and adapted for selective ground dispersal of said material as conveyed by air from said air blower.

2. A blower unit as defined in claim 1 wherein said power source is a tractor that is mountable and demountable to said blower unit at and/or near said forward end.

3. A blower unit as defined in claim 1 wherein said forward end includes a front end wall with augers/tines coupled thereto for breaking up the material and helping to direct said material to the transversely disposed feeder as the material is fed towards the forward end by the material mover.

4. A blower unit as defined in claim 3, where in the augers/tines are disposed at an angle with respect to vertical.

5. A blower unit as defined in claim 3, wherein there is an access port in said front end wall to allow access to the feeder.

6. A blower unit as defined in claim 1 wherein the rear end is provided with a door for selective access to the container interior.

7. A blower unit as defined in claim 1 wherein said feeder is generally centered at and/or near the forward end.

8. A blower unit as defined in claim 1 wherein said material metering mechanism further includes a mixing chamber and an air lock feeder.

9. A blower unit as defined in claim 1, wherein the hose is adapted to be coupled to the blower unit and adapted to extend from either side of the blower unit.

10. The blower unit of claim 1, wherein the blower and at least a portion of the material metering mechanism is disposed within a forward containment portion of the container.

* * * * *